US009867111B2

United States Patent
Petersson et al.

(10) Patent No.: US 9,867,111 B2
(45) Date of Patent: Jan. 9, 2018

(54) METHODS, NETWORK CONTROL NODES AND COMMUNICATION DEVICES FOR ROUTING SIGNALLING REQUESTS IN A COMMUNICATION SYSTEM

(71) Applicant: TELEFONAKTIEBOLAGET L M ERICSSON (PUBL), Stockholm (SE)

(72) Inventors: Justus Petersson, Hässelby (SE); Stefan Thuresson, Segeltorp (SE); Qiang Li, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/033,475

(22) PCT Filed: Nov. 7, 2013

(86) PCT No.: PCT/SE2013/051312
§ 371 (c)(1),
(2) Date: Apr. 29, 2016

(87) PCT Pub. No.: WO2015/069160
PCT Pub. Date: May 14, 2015

(65) Prior Publication Data
US 2016/0255567 A1  Sep. 1, 2016

(51) Int. Cl.
*H04W 4/00* (2009.01)
*H04W 40/02* (2009.01)
(Continued)

(52) U.S. Cl.
CPC ............. *H04W 40/02* (2013.01); *H04W 8/02* (2013.01); *H04W 8/12* (2013.01); *H04W 4/00* (2013.01)

(58) Field of Classification Search
CPC ......... H04W 40/02; H04W 8/02; H04W 8/12; H04W 4/00
(Continued)

(56) References Cited

U.S. PATENT DOCUMENTS

| 2007/0021118 A1* | 1/2007 | Ophir | H04W 8/06 455/432.1 |
| 2007/0293216 A1* | 12/2007 | Jiang | H04W 4/12 455/433 |

(Continued)

FOREIGN PATENT DOCUMENTS

| EP | 2635056 A2 | 9/2013 | |
| WO | 2013025806 A1 | 2/2013 | |
| WO | WO2014/020237 | * 8/2013 | H04W 8/12 |

*Primary Examiner* — Mong-Thuy Tran

(57) ABSTRACT

A method performed by a first network control node for routing a signaling request in a communication system comprising a home communication network and a visiting communication network. The signaling request originates from a communication device subscribing to the home communication network and having a home subscriber identification (ID). The communication device is registered to the visiting communication network with a local subscriber ID different from the home subscriber ID, the local subscriber ID being associated with the home subscriber ID. The method comprises receiving the signaling request originating from the communication device, the signaling request comprising the local subscriber ID, and detecting that the local subscriber ID is associated with the home subscriber ID. The method further comprises, in the signaling request, replacing the local subscriber ID with the home subscriber ID, and sending the signaling request comprising the home subscriber ID to a subscriber database of the home network.

13 Claims, 12 Drawing Sheets

(51) Int. Cl.
*H04W 8/12* (2009.01)
*H04W 8/02* (2009.01)

(58) Field of Classification Search
USPC .............................................. 455/432.1, 433
See application file for complete search history.

(56) References Cited

U.S. PATENT DOCUMENTS

| | | | |
|---|---|---|---|
| 2010/0093344 A1* | 4/2010 | Chan ........................ | H04W 8/02 455/433 |
| 2010/0136967 A1* | 6/2010 | Du ........................ | H04W 8/205 455/432.3 |
| 2012/0135722 A1* | 5/2012 | Jiang ........................ | H04W 8/12 455/415 |
| 2012/0282924 A1* | 11/2012 | Tagg ........................ | H04W 8/04 455/432.1 |
| 2015/0004967 A1* | 1/2015 | Jiang ........................ | H04W 8/06 455/433 |

* cited by examiner

METHODS, NETWORK CONTROL NODES AND COMMUNICATION DEVICES FOR ROUTING SIGNALLING REQUESTS IN A COMMUNICATION SYSTEM

This application is a 371 of Internationl Application No.PCT/SE2013/051312, filed nov.7, 2013, the discloure of which is fully incorporated herein by refence.

TECHNICAL FIELD

The present disclosure relates to methods performed by network control nodes for routing a signaling request in a communication system comprising a home communication network and a visiting communication network. The present disclosure further relates to a method performed by a communication device for communicating in a communication system comprising a home communication network and a visiting communication network. It also relates to corresponding network control nodes and a communication device.

BACKGROUND

The mobile communication system of the world comprises a plurality of mobile communication networks owned by different operators. A communication device is registered as a subscriber of a home communication network but can today, when moving to another communication network that the device is not subscribing to, acquire connectivity in this communication network. There are today two different general procedures for a communication device to acquire connectivity to another communication network, hereinafter called a visiting communication network: Roaming, and changing to a subscriber identity module, SIM, card from the operator of the visiting communication network.

In the roaming procedure, a global enterprise owning a number of communication devices all over the world, for example a machine-to-machine service provider, M2M SP, has a single business relationship and billing interface towards the home network operator. When in a visiting communication network owned by a roaming partner, a communication device will be roaming to get access through the roaming partner's access network while remaining being a subscriber of the home communication network. With a roaming solution, an enterprise can maintain single business relationship and billing interface towards its home communication network operator with roaming devices all over the world. However, roaming agreement is needed between each visiting communication network and the home communication network. A communication device will not be able to connect to the visiting communication network if the visiting communication network operator does not have a roaming agreement with the home communication network operator, or if roaming is not allowed in the visiting communication network, (e.g. due to operator determined barring of roaming by its home network operator).

In the changing of SIM card procedure, subscription is switched to the local network operator for the visiting communication network, (e.g. by changing to the new local network operator's SIM card in the device), so that the communication device can acquire the local connectivity and the visiting communication network becomes the new home communication network for the communication device. This means that the business relationship and billing relationship for the communication device subscription has also changed from its original home network operator to the new local network operator. A switch of subscription could give access to the communication device in VPLMN, but it does not allow the enterprise to maintain a single business relationship and billing interface for its devices towards its home network operator. The enterprise also cannot reuse the same functionality for its services and devices deployed all over the world because they are not serviced by single operator. Instead, the devices will get different functionalities and connectivity services by each different local network operator of each different visiting communication network.

Consequently, there is a need for a solution that enables a communication device subscribing to a home communication network to connect to a visiting communication network even without a roaming agreement between the home communication network operator and the visiting communication network operator, or without roaming signaling being established between the visiting communication network and the home communication network. This connection should preferably also be accomplished while the enterprise still keeps a single business relationship and billing interface towards the home communication network operator.

SUMMARY

It is an object of the invention to address at least some of the problems and issues outlined above. It is possible to achieve these objects and others by using a method and an apparatus as defined in the attached independent claims.

According to one aspect, a method is provided performed by a first network control node for routing a signaling request in a communication system comprising a home communication network and a visiting communication network. The signaling request originates from a communication device subscribing to the home communication network and having a home subscriber identification, ID. The communication device is registered to the visiting communication network with a local subscriber ID different from the home subscriber ID, the local subscriber ID being associated with the home subscriber ID. The method comprises receiving the signaling request originating from the communication device, the signaling request comprising the local subscriber ID and detecting that the local subscriber ID is associated with the home subscriber ID. The method further comprises in the signaling request, replacing the local subscriber ID with the home subscriber ID and sending the signaling request comprising the home subscriber ID to a subscriber database of the home network.

According to another aspect, a method is provided performed by a visiting network control node for routing a signaling request in a communication system comprising a home communication network and a visiting communication network, the signaling request originating from a communication device subscribing to the home communication network and having a home subscriber identification, ID. The communication device is further registered to the visiting communication network with a local subscriber ID different from the home subscriber ID, the local subscriber ID being associated with the home subscriber ID. The method comprises receiving the signaling request from the communication device, the signaling request comprising the local subscriber ID and identifying that the received local subscriber ID is associated with a first network control node to which the home network is connected. The method further comprises sending the signaling request comprising the local subscriber ID to the first network control node.

According to yet another aspect, a method is provided performed by a communication device for communicating in a communication system comprising a home communication network and a visiting communication network, the communication device subscribing to the home communication network and having a home subscriber identification, ID, and contacting the visiting communication network using its home subscriber ID. The method comprises receiving a local subscriber ID from the visiting network, for communication in the visiting network, the local subscriber ID being associated with the home subscribed ID and changing from the home subscriber ID to the local subscriber ID. The method further comprises registering to the visiting network using the local subscriber ID, and sending a signaling request to the visiting network comprising the local subscriber ID.

According to yet another aspect, a first network control node is provided for routing a signaling request in a communication system comprising a home communication network and a visiting communication network, the signaling request originating from a communication device subscribing to the home communication network and having a home subscriber identification, ID. The communication device is registered to the visiting communication network with a local subscriber ID different from the home subscriber ID, the local subscriber ID being associated with the home subscriber ID. The first network control node comprises a processor and a memory, said memory containing instructions executable by said processor. By these instructions said first network control node is operative for receiving the signaling request originating from the communication device, the signaling request comprising the local subscriber ID and detecting that the local subscriber ID is associated with the home subscriber ID. By these instructions said first network control node is further operative for replacing, in the signaling request, the local subscriber ID with the home subscriber ID and sending the signaling request comprising the home subscriber ID to a subscriber database of the home network.

According to another aspect, a visiting network control node is provided for routing a signaling request in a communication system comprising a home communication network and a visiting communication network, the signaling request originating from a communication device subscribing to the home communication network and having a home subscriber identification, ID. The communication device is further registered to the visiting communication network with a local subscriber ID different from the home subscriber ID, the local subscriber ID being associated with the home subscriber ID. The visiting network control node comprises a processor and a memory, said memory containing instructions executable by said processor. By these instruction said visiting network control node is operative for receiving the signaling request from the communication device, the signaling request comprising the local subscriber ID and identifying that the received local subscriber ID is associated with a first network control node to which the home network is connected. By these instruction said visiting network control node is further operative for sending the signaling request comprising the local subscriber ID to the first network control node.

According to another aspect, a communication device is provided for communicating in a communication system comprising a home communication network and a visiting communication network, the communication device subscribing to the home communication network and having a home subscriber identification, ID, and arranged to contact the visiting communication network using its home subscriber ID. The communication device comprises a processor and a memory, said memory containing instructions executable by said processor. By these instructions said communication device is operative for receiving a local subscriber ID from the visiting network, for communication in the visiting network, the local subscriber ID being associated with the home subscribed ID and changing from the home subscriber ID to the local subscriber ID. By these instructions said communication device is further operative for registering to the visiting network using the local subscriber ID and sending a signaling request to the visiting network comprising the local subscriber ID.

According to other aspects, computer programs and computer program products are also provided, the details of which will be described in the claims and the detailed description.

The above described methods and apparatuses may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to make it possible for a communication device subscribing to a home communication network using a home subscriber ID to connect to a visiting communication network using a local subscriber ID without standard roaming agreements and roaming fees and without completely changing subscription to the visiting communication network operator. The local subscriber ID is then associated with the home subscriber ID. The association is performed and stored in a first network control node, preferably after (or triggered by) the communication device has tried to connect to the visiting communication network using its home subscriber ID. By the communication device being able to receive the local subscriber ID associated with the home subscriber ID, change its stored home subscriber ID to the local subscriber ID and send a signaling request to the visiting communication network control node using the local subscriber ID, it is possible for the communication device to communicate with the visiting communication network using the local subscriber ID without having to change SIM card. Further, by identifying in the visiting communication network control node that the local subscriber ID is associated with the first network control node, it is possible for the visiting communication control node to route the signaling request to the first network control node. Further, by identifying that the local subscriber ID of the signaling request received from the visiting communication network is associated with the home subscriber ID it is possible for the first network control node to route the signaling request to the subscriber database of the home network. Thereby, the communication device can be billed by the home network even though a local subscriber ID is used. This makes it possible for e.g. a large enterprise having a large number of communication devices spread over the world to only get bills from one operator, i.e. the operator of the home network, or at least from a smaller amount of operators compared to today. The first network control node may be arranged in the visiting communication network, the home communication network or in a communication network separate from the visiting and the home communication network.

Figure 1:
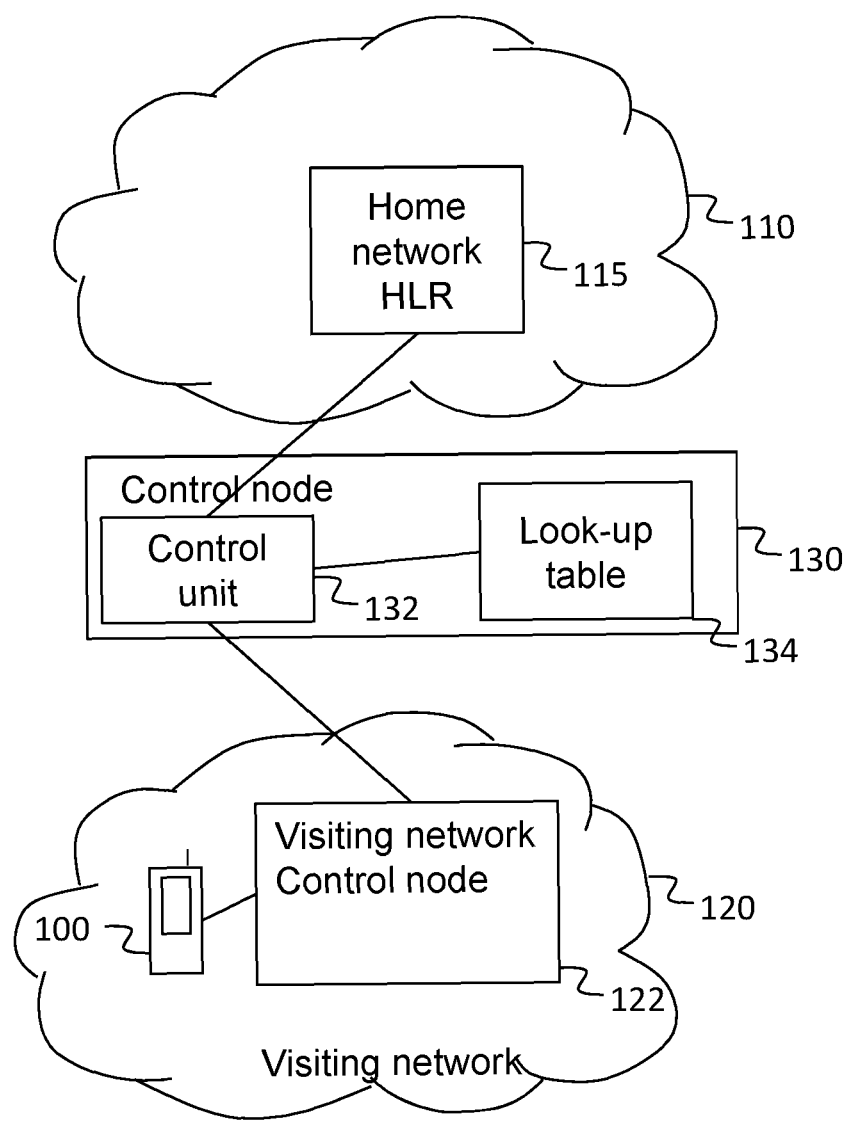
FIG. 1 is a schematic block diagram of an exemplary communication system in which the present invention may be used.

FIG. 1 shows an exemplary communication system in which embodiments of the present invention may be used. The communication system comprises a home communication network 110 comprising a subscriber database 115 realized as a home location register, HLR. The communication system further comprises a first network control node 130 comprising a control unit 132 with a look-up table 134 connected to it. The communication system further comprises a visiting communication network 120 comprising a control node 122. The home communication network is also called the home network in the disclosure. The visiting communication network is also called the visiting network in the disclosure. The control node is connected to the home network HLR 115 and to the visiting network control node 122. Observe that FIG. 1 only shows an alternative communication system architecture in which embodiments of the present invention may be used. Other communication system architectures may be used, for example, another communication system architecture will be presented later in connection with FIG. 7, in which the home network HLR and a visiting network HLR will be implemented in the first network together with the first network control node. Anyhow, the different communication system architectures involve a first network control unit, a home network subscriber database and a visiting network control node.

Figure 2:
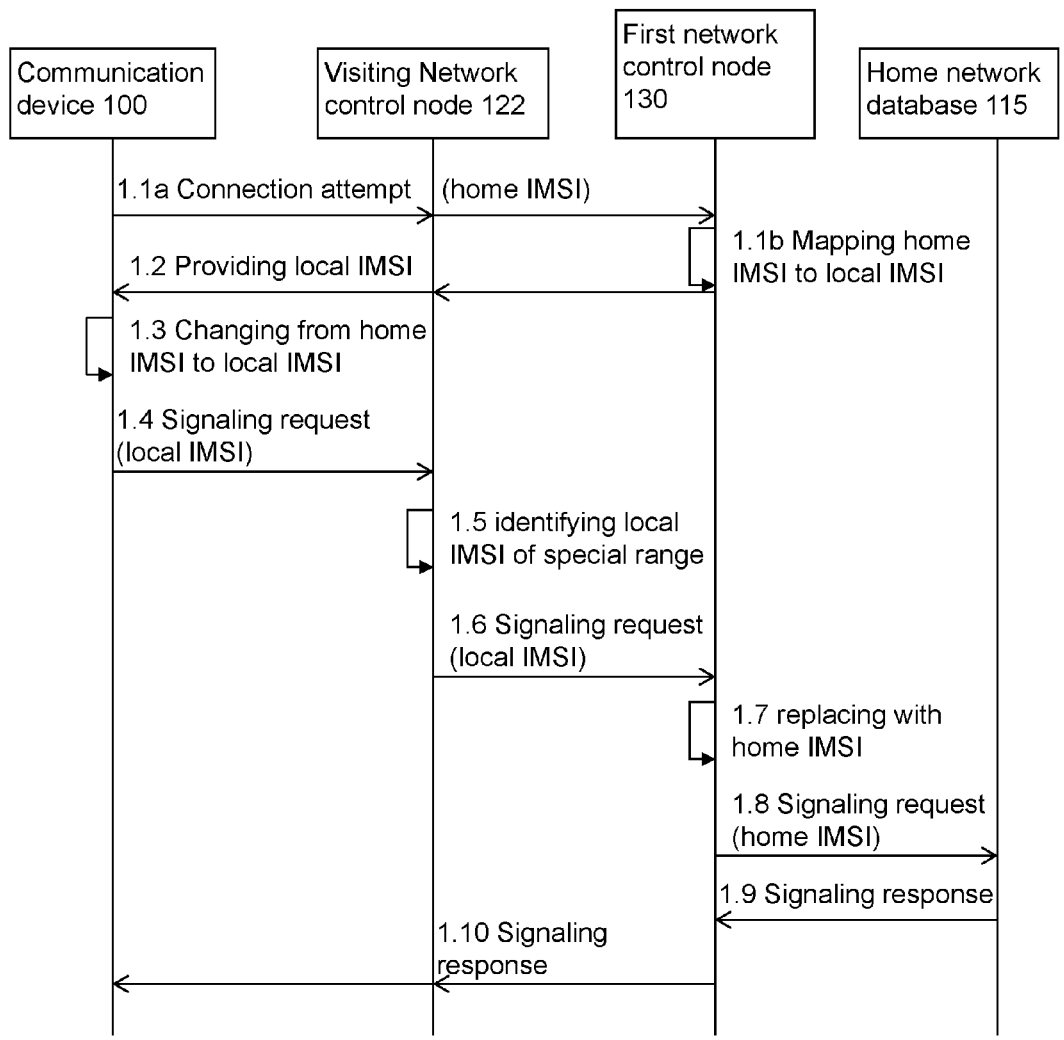
FIG. 2 is a signaling diagram of methods according to an embodiment.

FIG. 2 shows an exemplary embodiment of the signaling taking place between the different communication nodes of FIG. 1. When a communication device 100 subscribing to the home communication network 110 arrives at the visiting communication network 120, it tries to connect 1.1a to the visiting network with its home International Mobile Subscriber Identity, IMSI. The IMSI is an example of a subscriber identification. Another example of a home subscriber ID is a Mobile Station International Subscriber Directory Number, MSISDN. When the visiting network control node 122 receives the connection attempt it identifies the IMSI to be from another network and sends the connection attempt to the first network control node 130. The first network control node 130 maps 1.1b the home IMSI to a local IMSI and stores the mapping in the look-up table 134 (FIG. 1). The local IMSI is an IMSI for use in the visiting network. The local IMSI is taken from a range of IMSI numbers dedicated to communication devices from the home network visiting the visiting network. The first network control node then provides 1.2 the local IMSI to the communication device 100 via the visiting network control node 122. The communication device then changes 1.3 the home IMSI that it has stored, e.g. on its SIM card, to the local IMSI, and registers to the visiting network 120 with the local IMSI. Thereafter, the communication device 100 sends a signal request 1.4 comprising the local IMSI to the visiting network control node 122. The visiting network control node 122 identifies 1.5 that the IMSI is from the range of numbers dedicated to communication devices from other networks than the home network, and sends 1.6 the signaling request to the first network control node 130. The visiting network control node 122 may have been pre-configured with the range of IMSI numbers for which signaling requests are to be sent to the first network control node or the visiting network control node may be instructed by the first network control node for an individual IMSI number, e.g. at provisioning 1.2 of the local IMSI from the first network control node to the visiting network control node.

When the signaling request comprising the local IMSI is received 1.6 at the first network control node 130, the first network control node 130 detects that the local IMSI is associated with the home IMSI by checking its look-up table 134, and then replaces 1.7 the local IMSI with the home IMSI in the signaling request and sends 1.8 the signaling request comprising the home IMSI to the home network subscriber database 115. Thereafter, the home network subscriber database 115 sends 1.9 a signaling response to the first network control node 130, which sends 1.10 the signaling response to the communication device 100 via the visiting network control node. Traffic (e.g. SMS or data) may now be routed to the home network and billing calculations will be performed by the home network, e.g. by a business support system of the home network so that the enterprise that owns the communication device only gets a bill from the home network.

Figure 3:
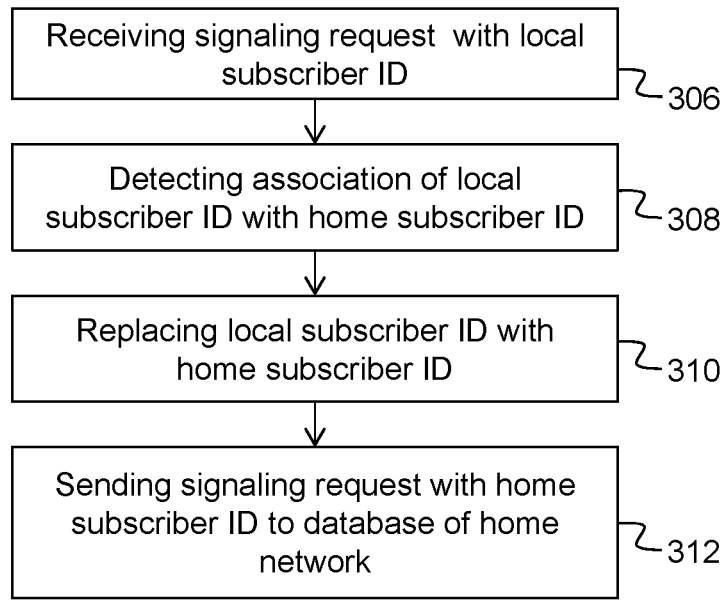
FIGS. 3-6 are flow charts describing methods according to embodiments of the invention.

FIG. 3 is a flow chart illustrating a method according to an embodiment performed in the first network control node 130 for routing a signaling request in a communication system comprising the home communication network 110 and the visiting communication network 120. The signaling request originates from a communication device 100 subscribing to the home communication network 110 and having a home subscriber identification, ID. The communication device 100 is further registered to the visiting communication network 120 with a local subscriber ID different from the home subscriber ID, the local subscriber ID being associated with the home subscriber ID. The method comprises receiving 306 the signaling request originating from the communication device, the signaling request comprising the local subscriber ID, and detecting 308 that the local subscriber ID is associated with the home subscriber ID. Further, the method comprises in the signaling request, replacing 310 the local subscriber ID with the home subscriber ID and sending 312 the signaling request comprising the home subscriber ID to a subscriber database 115 of the home network.

The first network node may be a node of a first network that is different from both the home network and the visiting network. Alternatively, the first network node may be a node of any of the home network or the visiting network. A signaling request is any kind of request for a service in the communication network, such as an authentication request, location update request, a request for sending an SMS, setting up a voice call, etc. The home communication network is the network to which the communication device is registered as a subscriber. The home subscriber ID is a subscriber ID, e.g. IMSI, or MSISDN, etc, which the communication device normally uses, for example when communicating in the home communication network, and when roaming in other communication networks. The visiting communication network is the network that the communication device currently visits, i.e. is temporary connected to. The local subscriber ID is a subscriber ID, e.g. IMSI, or MSISDN, etc, which the communication device uses for communication in the visiting network, which makes it possible for the communication device to have a local connection in the visiting network without having to roam.

By replacing the temporary local subscriber ID with the home subscriber ID and sending the signaling request with the home subscriber ID to the subscriber database of the home communication network it is possible for the home communication network to e.g. bill the owner of the communication device for the service requested in the signaling request. Further, it is possible for a subscriber of the home network to have a local communication in the visiting communication network without having to perform standard roaming. This makes it possible for an enterprise to only have an agreement with the home communication network and not necessarily with the visiting communication network, and this without having to pay high roaming costs.

According to an embodiment, the method may further comprise, before the communication device is registered to the visiting communication network, receiving 302 a connection attempt from the device, the connection attempt comprising the home subscriber ID and, optionally, checking that the communication device is allowed to acquire the local subscriber ID. The method may further comprise, when the communication device is allowed to acquire the local subscriber ID, mapping 303 the home subscriber ID to the local subscriber ID, and providing 304 the local subscriber ID to the communication device. By such a mapping of home subscriber ID to local subscriber ID, it is possible to route the signaling request correctly to the home network when the signaling request is received at the first network control node. The mapping may advantageously be performed after the connection attempt is received. Thereby, it is possible to dynamically map local subscriber ID to the home subscriber ID. The local subscriber ID is selected according to which visiting network the signaling request is originating from. The checking of allowance may be performed by checking from a predefined policy that the device is allowed to acquire a local subscriber ID.

According to an embodiment, the method may further comprise storing 304 the link of the home subscriber ID to the local subscriber ID in a mapping table. Further, the detecting 308 that the local subscriber ID is associated with the home subscriber ID comprises checking the mapping table and finding the link. By linking the home subscriber ID to the local subscriber ID and then storing the link in a mapping table, the subsequent routing of the signaling request is performed by checking the mapping table, finding the link to the home network ID and routing the signaling request to the subscriber database of the home network.

According to another embodiment, the local subscriber ID is from a range of IDs that is predefined for devices subscribing to the home network, including the communication device 100. By taking the local subscriber ID from a predefined range of IDs it is possible to dynamically map the device's home subscriber ID to a local subscriber ID, when the device tries to connect to the visiting network, i.e. when the need for a local subscriber ID arises. According to another embodiment, the local subscriber ID is selected according to which visiting network the signaling request is originated from.

According to another embodiment, the first network control node is positioned in a first network different from the home network and different from the visiting network, and wherein the subscriber database of the home network is positioned in the first network. Thereby, it is possible for an enterprise that controls the first network to control the communication between the home communication network and the visiting communication network such that e.g. the owner of the communication device can be billed from the home network. The first network may be called a device connection platform and hosts the first network control node and the subscriber database of the home network. See also FIG. 7 for more information of this embodiment.

Figure 5:
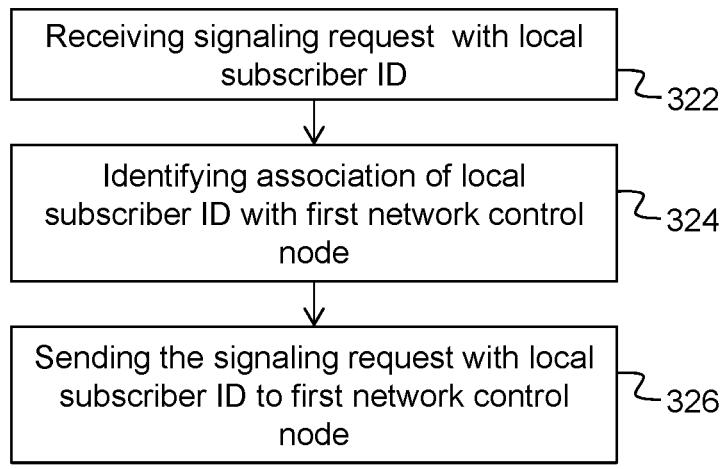

FIG. 5 shows a method performed by a visiting network control node 122 for routing a signaling request in a communication system comprising a home communication network 110 and a visiting communication network 120. The signaling request originates from a communication device 100 subscribing to the home communication network 110 and having a home subscriber identification, ID, and the communication device is further registered to the visiting communication network 120 with a local subscriber ID different from the home subscriber ID, the local subscriber ID being associated with the home subscriber ID. The method comprises receiving 322 the signaling request from the communication device, the signaling request comprising the local subscriber ID, identifying 324 that the received local subscriber ID is associated with a first network control node 130 to which the home network is connected, and sending 326 the signaling request comprising the local subscriber ID to the first network control node.

The visiting network control node is a control node of the visiting communication network. By such a method the visiting network control node will detect from the local subscriber ID that the request is to be routed to the first network control node. Then the first network control node will detect that the local subscriber ID is associated with the home subscriber ID, convert the local subscriber ID to home subscriber ID in the signaling request, and route the request to the home network and the subscriber database of the home network, as described in the method shown in FIG. 3.

Figure 4:
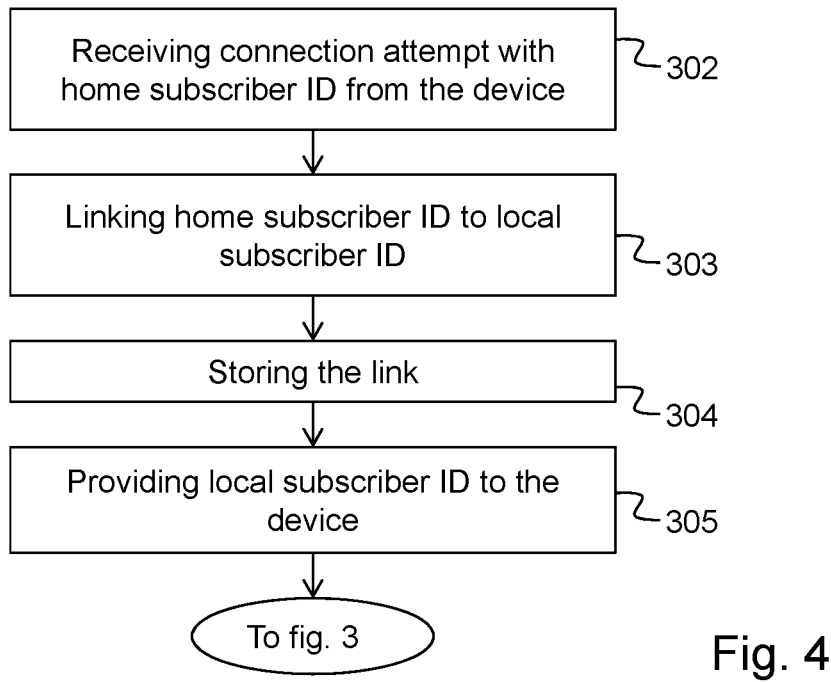

For identifying that the received local subscriber ID is associated with a first network control node, a link between the received local subscriber ID and the first network control node may be stored at the visiting network control node. The link may either be pre-stored or the link may be setup when the visiting network control node receives the local subscriber ID that the first network control node provides to the communication device via the visiting network control node in step 305 of FIG. 4.

According to another embodiment, the identifying 324 comprises identifying that the local subscriber ID is from a range of IDs predefined for devices subscribing to other communication networks than the visiting communication network, the other communication networks being connected to the first network control node and the other communication networks including the home communication network.

Figure 6:
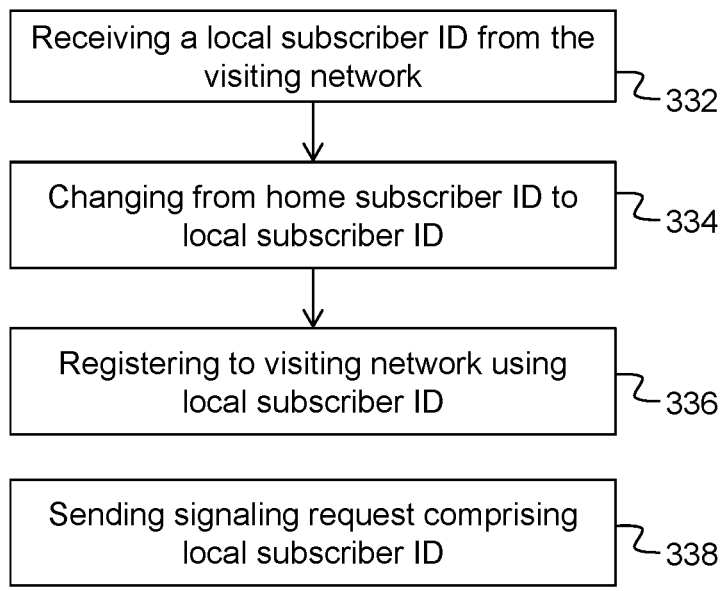

FIG. 6 shows a method performed by a communication device 100 for communicating in a communication system comprising a home communication network 110 and a visiting communication network 120. The communication device 100 subscribes to the home communication network 110 having a home subscriber identification, ID, and contacts the visiting communication network 120 using its home subscriber ID. The method comprises receiving 332 a local subscriber ID from the visiting network, for communication in the visiting network, the local subscriber ID being associated with the home subscribed ID, changing 334 from the home subscriber ID to the local subscriber ID, registering 336 to the visiting network using the local subscriber ID, and sending 338 a signaling request to the visiting network comprising the local subscriber ID. The changing from home to local subscriber ID may be performed at the subscriber identity module, SIM, of the communication device. Such a method makes it possible for the communication device 100 to connect to the visiting network control node using a received local subscriber ID, and to send a request to the visiting network using the local subscriber ID. The visiting network control node then identifies that the local subscriber ID is associated with a first network control node, as described in FIG. 3, and sends the request further to the first network control node that treats the request as described in FIG. 5.

Figure 7:
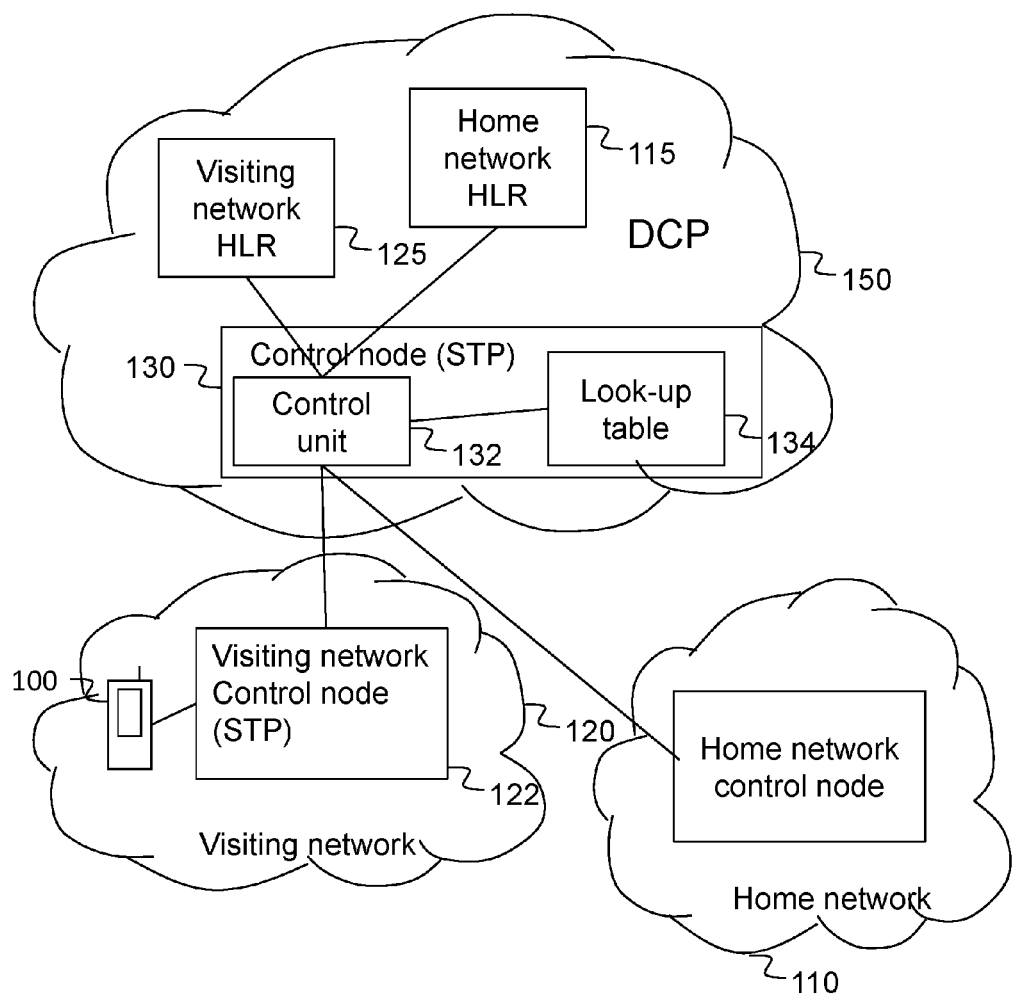
FIGS. 7-9 are schematic block diagrams of exemplary communication systems in which the present invention may be used.

FIG. 7 shows an embodiment of a communication system comprising a device connection platform, DCP 150. The device connection platform works like a hosted core network as a service for multiple operators. In this embodiment, the home network HLR 115 and a visiting network HLR 125 are both placed in the DCP 150. The DCP may be seen as a communication network, e.g. the first communication network, as mentioned earlier. The DCP with its control node 130 and including the visiting network HLR 125 and the home network HLR 115 may be hosted and owned by the DCP network owner. The home network HLR 115 and the visiting network HLR 125 may be situated in one common DCP HLR. The actual subscriber may be hosted and managed by the home network, not by the visiting network. The visiting network may only provide the local network access and local IMSI for the home network subscriber to get local access.

In the following, the visiting network is called MNO2, and the home network is called MNO1. Further the control nodes of this embodiment are Signaling Transfer Points, STPs, which are arranged for routing SS7 messages. Further, a Global Title, GT is used which is an example of a subscriber ID. The GT could be based on e.g. IMSI (E.212), MSISDN (E.164), or combined IMSI+MSISDN (Mobile Global Title, MGT, E.214). A purpose of this embodiment is to enable the communication device belonging to a subscriber, for example an enterprise, subscribing to the home network to connect to MNO2 even without roaming agreement between MNO2 operator and MNO1 operator while at the same time the enterprise still keeps the single business relationship and billing interface towards the MNO1 operator. The enterprise can also reuse the same functionality for its services and connectivity all over the world with its single service provider MNO1.

The communication device will be provisioned with MNO2 GT when located in the MNO2. MNO2 GT is from a special GT range which may be predefined and stored in DCP STP 130. All signaling requests containing such MNO2 GT will be routed via MNO2 STP 122 to DCP STP 130, and in DCP STP 130 the MNO2 GT will be replaced by MNO1 GT and then redirected to MNO1 HLR. MNO1 HLR will then respond to the node which initiated the original request via STP. Basically the MNO2 GT will be replaced by MNO1 GT in a Signaling Connection Control Point. SCCP, message, and then the SCCP message will use the GT to route the message to the MNO1 HLR. When changing from MNO2 GT to MNO1 GT in the message, the Mobile Country Code/Mobile Network Code, MCC/MNC, is also changed from MNO2 to MNO1 so that the message will be routed to MNO1. The signaling redirect (MNO2 GT→MNO1 GT) is done in the DCP STP 130, so that the signaling will route on MNO2 GT before reaching the DCP STP 130 and then will route on the MNO1 GT after processed by the DCP STP 130, and then DCP STP routes the message to the MNO1 HLR.

Figure 8:
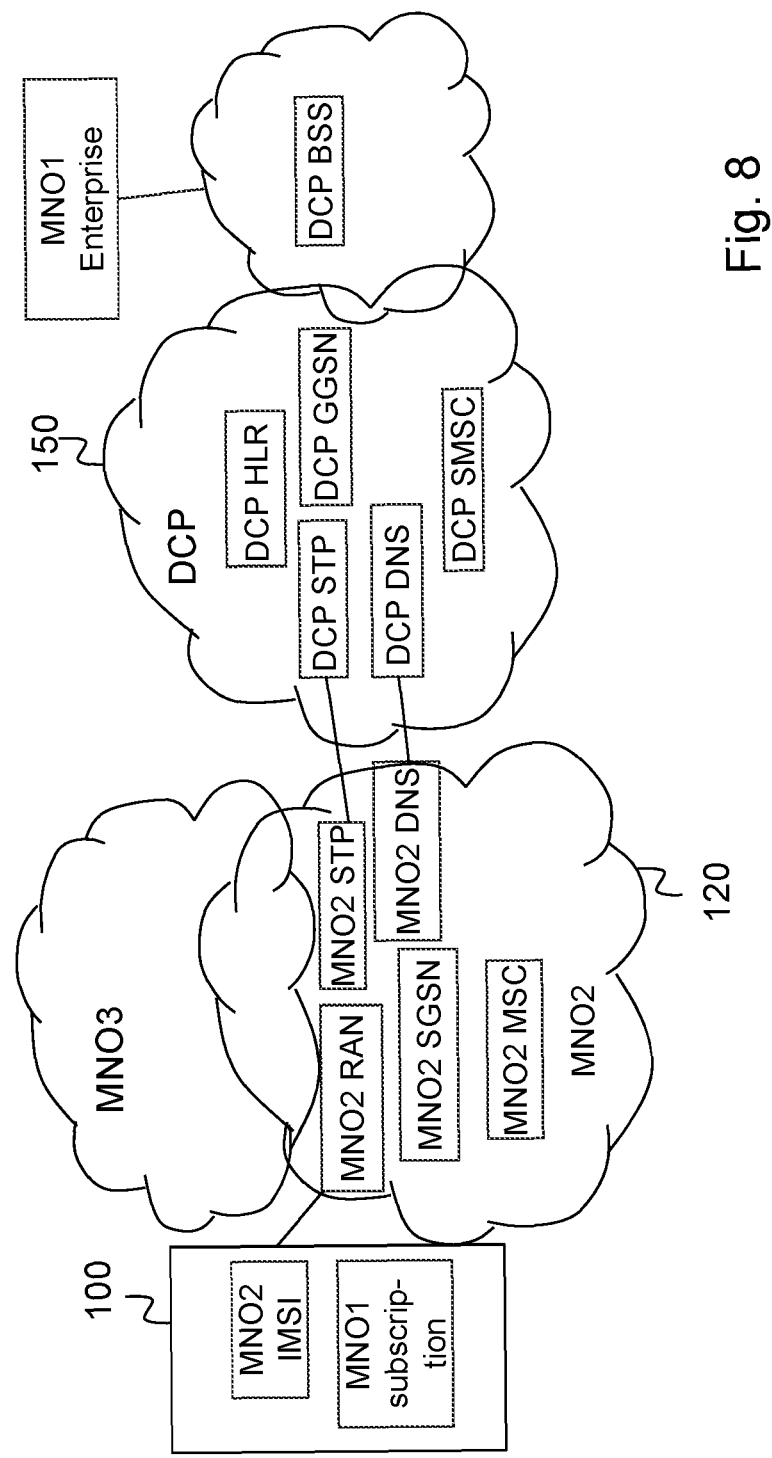

According to another embodiment shown in FIG. 8, MNO1 is fully on-boarded to the DCP network 150, i.e. the DCP STP, the DCP HLR, the DCP General Packet Radio Service, GPRS, Gateway Support Node, GGSN, the DCP Short Message Service Center, SMS-C, are all used for MNO1 and also shared with other operators fully on-boarded to the DCP network 150. Further, MNO2 120 is partly on-boarded to DCP Network, i.e. MNO2 STP is connected to DCP STP. Signaling from the Serving GPRS Support Node, SGSN, in MNO2 is routed by the MNO2 STP recognizing the special IMSI range allocated for this service through a private connection to the DCP-STP in the central DCP system.

Figure 9:
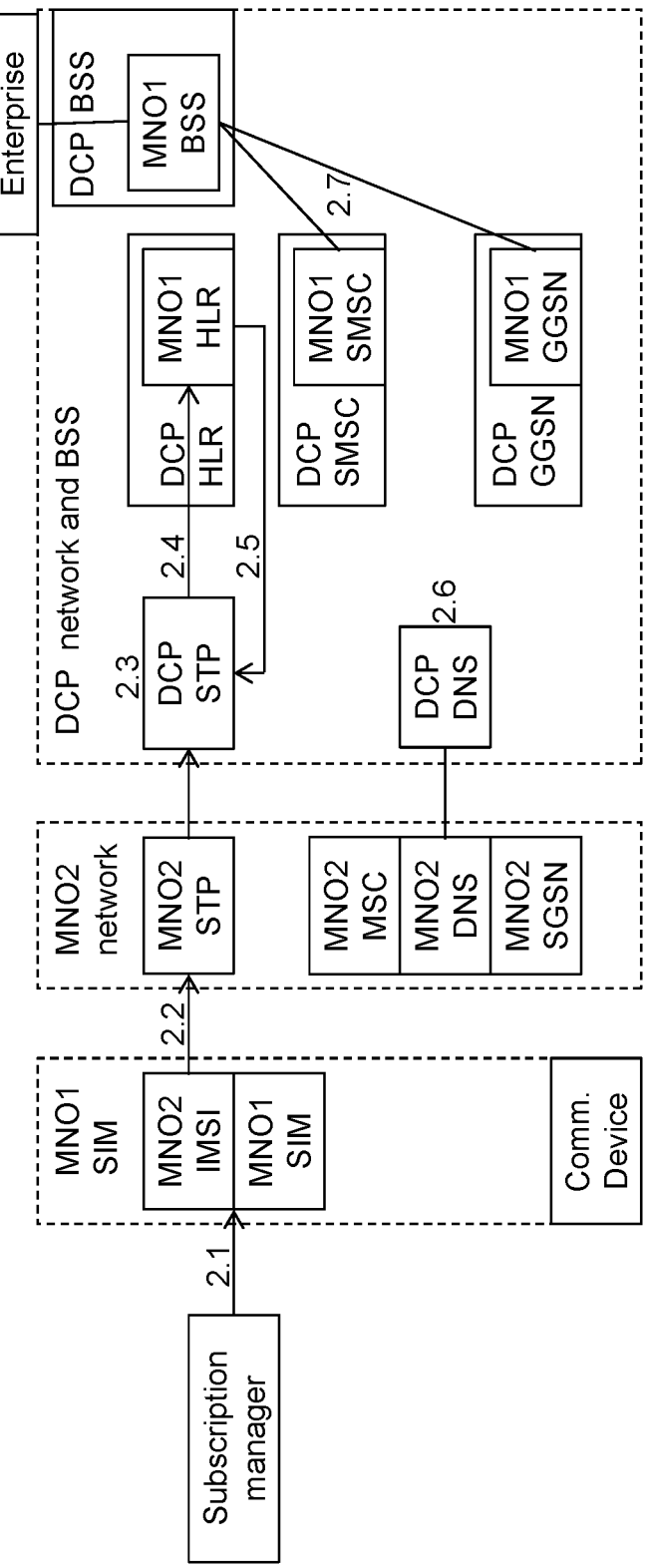

FIG. 9 shows signaling between blocks of a communication network according to an embodiment, A signal originates from a subscription manager, which maybe for example a SIM provisioning by over-the-air server, SIMOTA server or an embedded Universal integrated Circuit Card, eUICC, subscription manager The subscription manager triggers 2.1 changing of IMSI to local MNO2 IMSI at the SIM of the communication device for enabling local access to MNO2 for the communication device belonging to MNO1. The subscription manager acquires MNO2 IMSI from a special IMSI range from DCP HLR via BSS. Only MNO2 IMSI may be provisioned. Other credentials e.g. KI (a unique number for each subscriber), algorithms, is still kept for MNO1. The authentication should be done by MNO1 HLR or Authentication Center, AuC, by using MNO1 KI and MNO1 algorithms. All signaling with MNO2 IMSI will be replaced with MNO1 IMSI once arrived at DCP STP, and then will be redirected to MNO1 HLR (via DCP STP). Thereafter, all signaling, all traffic and all billing information will go to home MNO (MNO1).

The device changes to MNO2 IMSI and connects 2.2 to the MNO2 network (Radio access and Core network) with MNO2 IMSI. Signaling from the SGSN in MNO2, e.g. MAP signaling, is routed by the MNO2 STP recognizing the special IMSI range allocated for this service through a private connection to the DCP-STP in the central DCP system. At 2.3, the DCP STP receives the signaling request and checks that the MNO2 IMSI is in a special IMSI range and mapped to MNO1 IMSI/GT that is hosted by MNO1 HLR. DCP STP then replaces the MNO2 IMSI/GT with the MNO1 IMSI/GT in the SCCP message and redirects 2.4 the signaling request to the MNO1 HLR. The signaling request will be routed from DCP STP to MNO1 HLR by replacing the MNO2 IMSI/GT with MNO1 IMSI/GT in the signaling request. There is a mapping table in the DCP STP for replacing MNO2 IMSI/GT with MNO1 IMSI/GT. The signaling redirect 2.4 (MNO2 IMSI/GT→MNO1 IMSI/GT) is done in the DCP STP in the signaling network, so that the signaling will route on MNO2 IMSI/GT before reaching the DCP STP and then will route on the MNO1 IMSI/GT after processed by the DCP STP. Then the DCP STP routes the message to the MNO1 HLR.

MNO1 HLR will then send 2.5 a signaling response to the DCP STP which will route the signaling response to the original MNO2 nodes. The MNO1 SMS-C and MNO1 APN will be kept in the device SIM profile, MNO1 SIM, as part of MNO1 subscription profile, so that all SMS traffic and data traffic will still be routed to MNO1 SMS-C and MNO1 GGSN. MNO2 DNS receives APN lookup request from the SGSN and will forward 2.6 the APN lookup request to DCP DNS, which will then return MNO1 GGSN address to the MNO2 SGSN for setting up the GTP tunnel.

MNO1 SMS-C and MNO1 GGSN will receive all UL/DL traffic for the device and generate traffic Call Data Records, CDR, and send 2.7 to MNO1 BSS for billing and invoicing to MNO1 Enterprise (i.e. the enterprise owning the communication device). The MNO1 BSS may also include an enterprise self service portal, so that the enterprise can reuse the same service functionalities from all over the world for managing its globally deployed devices and services.

In the following, a possible exemplary implementation of the signaling redirect step procedure is described. As mentioned, only the MNO2 IMSI is provisioned into the MNO1 SIM card when moving to the new country. All other parameters in the SIM card are still using the same as MNO1, e.g. KI, algorithm, etc. MNO2 STP configures a special MNO2 IMSI range (or ranges) in an IR21 (International Roaming 21) roaming routing table to route signaling with MNO2 IMSI/GT to DCP STP. Further, the DCP STP configures an IMSI/GT mapping/converting table. All the signaling coming to DCP STP with a MNO2 IMSI/GT within the special range will be replaced by MNO1 IMSI/GT according to the mapping table. Then the DCP STP will forward the signaling to a MNO1 HLR front end, FE, of the MNO1 HLR based on the MNO1 IMSI/GT. Such signaling request could be e.g. any of the following examples: An authentication request from MNO2 IMSI (MNO1 operator keys, algorithm and KI will be used to generate authentication vector); an attach request from MNO2 IMSI; a Location update request from MNO2 MSC/VLR or MNO2 SGSN; Mobile Terminated, MT, signaling request towards the MNO2 IMSI, e.g. Send Routing Information, SRI, request from other network, MT SMS request from MNO1 SMSC, Cancel Location request from MNO1 HLR, MT Call request from GMSC; SMSC and APN from the MNO1 SIM card will still be using MNO1 so that all the traffic will go via MNO1 network and CDR will be generated and sent to MNO1 BSS with MNO2 IMSI. Further, MNO1 BSS has an IMSI mapping table to store the mapping between MNO2 IMSI and MNO1 IMSI so that all the CDR with MNO2 IMSI will be replaced with MNO1 IMSI and sent to a revenue management function in the MNO1 BSS for rating and billing purpose. MNO2 IMSI will be visible from BSS frond end management but on the backend it is mapped and replaced with MNO1 IMSI for provisioning MNO1 IMSI subscription data into a MNO1 Centralized User Database, CUDB, (not shown) placed in the DCP network.

As mentioned, MNO1 subscription uses MNO2 IMSI from special MNO2 IMSI ranges, other information in a subscription profile, e.g. APN, SMS-C, price profile, roaming profile, PDP context profile, bearer services, etc are from MNO1. KI and algorithms are also from MNO1.

Figure 10:
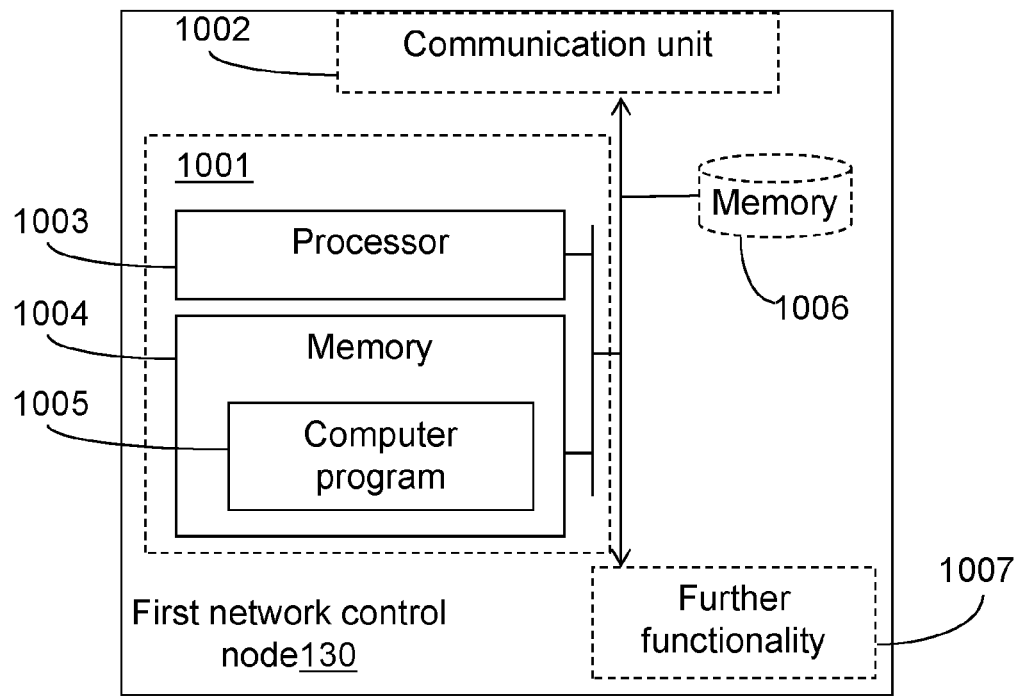
FIGS. 10-18 are schematic block diagrams showing different embodiments of the invention.

FIG. 10 (see also FIG. 1 or FIG. 7) shows a first network control node 130 for routing a signaling request in a communication system comprising a home communication network 110 and a visiting communication network 120. The signaling request originates from a communication device 100 subscribing to the home communication network 110 and having a home subscriber identification, ID. The communication device is registered to the visiting communication network 120 with a local subscriber ID different from the home subscriber ID and the local subscriber ID is associated with the home subscriber ID. The first network control node 130 comprises a processor 1003 and a memory 1004, said memory containing instructions executable by said processor. Said first network control node 130 is operative for receiving the signaling request originating from the communication device, the signaling request comprising the local subscriber ID, and detecting that the local subscriber ID is associated with the home subscriber ID. Said first network control node 130 is further operative for replacing, in the signaling request, the local subscriber ID with the home subscriber ID and sending the signaling request comprising the home subscriber ID to a subscriber database 115 of the home network. The first network control node 130 may further comprise a communication unit 1002, which may be considered to comprise conventional means for communicating from and/or to the other nodes in the network, such as the visiting network control node 122 and the home network subscriber database 115. The conventional communication means may include at least one transmitter and at least one receiver. The first network control node 130 may further comprise one or more storage units 1006 and further functionality 1007 useful for the first network control node 130 to serve its purpose as first network control node. The instructions executable by said processor may be arranged as a computer program 1005 stored in said memory 1004. The processor 1003 and the memory 1004 may be arranged in an arrangement 1001. The arrangement 1001 may alternatively be a micro processor and adequate software and storage therefore, a Programmable Logic Device, PLD, or other electronic component(s)/processing circuit(s) configured to perform the actions, or methods, mentioned above.

According to an embodiment, the first network control node may further be operative for receiving a connection attempt from the device, the connection attempt comprising the home subscriber ID, and, optionally, checking that the communication device is allowed to acquire the local subscriber ID. Further, the first network control node may be operative for, when the communication device is allowed to acquire the local subscriber ID, linking the home subscriber ID to the local subscriber ID; and providing the local subscriber ID to the communication device.

According to another embodiment, the first network control node may be operative for storing the link of the home subscriber ID to the local subscriber ID in a mapping table. Further, the detecting that the local subscriber ID is associated with the home subscriber ID may comprise checking the mapping table and finding the link.

According to another embodiment, the local subscriber ID is from a range of IDs that is predefined for devices subscribing to the home network, including the communication device 100.

According to yet another embodiment, the first network control node may be positioned in a first network different from the home network and different from the visiting network and the subscriber database of the home network may be positioned in the first network.

Figure 11:
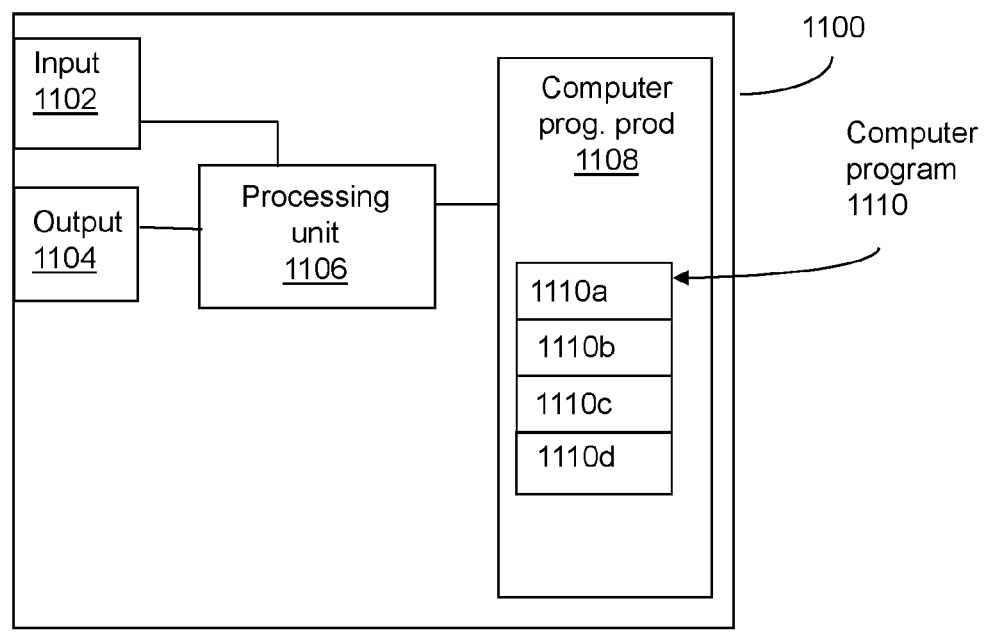

FIG. 11 schematically shows an embodiment of an arrangement 1100 for use in first network control node 130, which arrangement also can be an alternative way of implementing an embodiment of the arrangement 1001 illustrated in FIG. 10. Comprised in the arrangement 1100 is a processing unit 1106, e.g. with a DSP, Digital Signal Processor, or a microprocessor. The processing unit 1106 may be a single unit or a plurality of units to perform different actions of procedures described herein. The arrangement 1100 may also comprise an input unit 1102 for receiving signals from other entities, and an output unit 1104 for providing signal(s) to other entities. The input unit 1102 and the output unit 1104 may be arranged as an integrated entity.

Furthermore, the arrangement 1100 comprises at least one computer program product 1108 in the form of a non-volatile or volatile memory, e.g. an EEPROM (Electrically Erasable Programmable Read-only Memory), a flash memory, a disk drive or a RAM (Random-access memory). The computer program product 1108 comprises a computer program 1110, which comprises code means, which when executed in the processing unit 1106 in the arrangement 1100 causes the arrangement to perform the actions of any of the procedures described earlier in conjunction with FIGS. 3 and 4.

Figure 12:
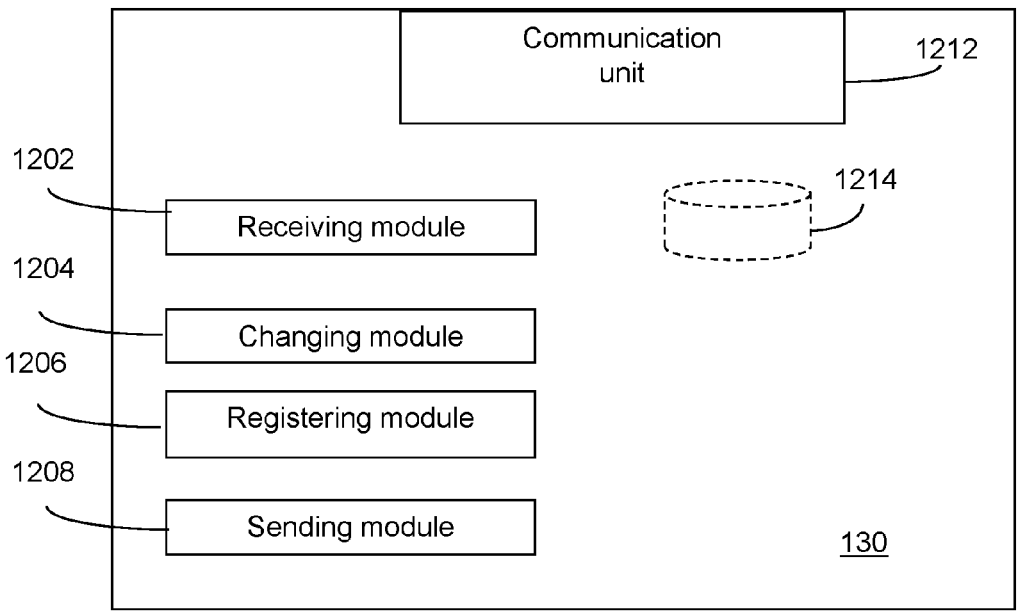

The computer program 1110 may be configured as a computer program code structured in computer program modules. Hence, in an exemplifying embodiment, the code means in the computer program 1110 of the arrangement 1100 comprises a receiving module 1110a for receiving the signaling request originating from the communication device, the signaling request comprising the local subscriber ID, a detecting module 1110b for detecting that the local subscriber ID is associated with the home subscriber ID, a replacing module 1110c for replacing, in the signaling request, the local subscriber ID with the home subscriber ID, and a sending module 1110d for sending the signaling request comprising the home subscriber ID to a subscriber database 115 of the home network FIG. 12 shows a first network control node 130 according to an embodiment for routing a signaling request in a communication system comprising a home communication network 110 and a visiting communication network 120, the signaling request originating from a communication device (100) subscribing to the home communication network (110) and having a home subscriber identification, ID. The communication device is registered to the visiting communication network 120 with a local subscriber ID different from the home subscriber ID, the local subscriber ID being associated with the home subscriber ID. The first network control node 130 comprises a receiving module 1202 for receiving the signaling request originating from the communication device, the signaling request comprising the local subscriber ID, a detecting module 1204 for detecting that the local subscriber ID is associated with the home subscriber ID, a replacing module 1206 for replacing, in the signaling request, the local subscriber ID with the home subscriber ID, and a sending module 1208 for sending the signaling request comprising the home subscriber ID to a subscriber database 115 of the home network. The first network control node according to this embodiment may also comprise a conventional communication unit 1212 similar to the communication unit 1002 of FIG. 10 and a memory 1214.

Figure 13:
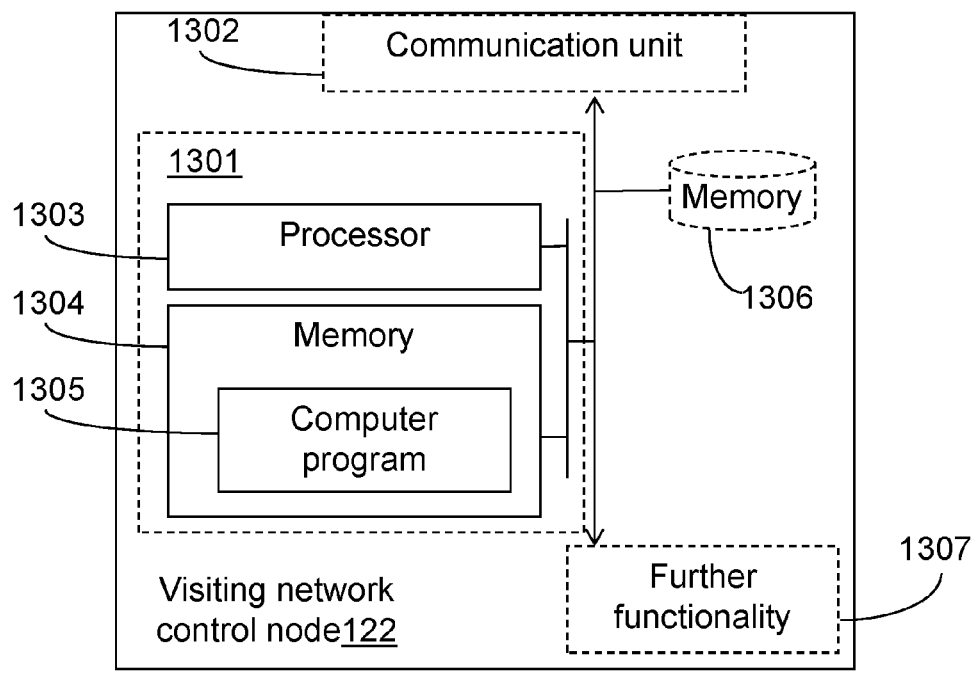

FIG. 13 shows an embodiment of a visiting network control node 122 for routing a signaling request in a communication system comprising a home communication network 110 and a visiting communication network 120, the signaling request originating from a communication device 100 subscribing to the home communication network 110 and having a home subscriber identification, ID. The communication device is further registered to the visiting communication network 120 with a local subscriber ID different from the home subscriber ID and the local subscriber ID is associated with the home subscriber ID. The visiting network control node 122 comprises a processor 1303 and a memory 1304, said memory containing instructions executable by said processor. Said visiting network control node 122 is operative for receiving the signaling request from the communication device, the signaling request comprising the local subscriber ID, identifying that the received local subscriber ID is associated with a first network control node 130 to which the home network is connected, and sending the signaling request comprising the local subscriber ID to the first network control node. The visiting network control node 122 may further comprise a communication unit 1302, which may be considered to comprise conventional means for communicating from and/or to the other nodes in the network, such as the first network control node 122 and an access network via which the communication device connects to the visiting network control node. The conventional communication means may include at least one transmitter and at least one receiver. The visiting network control node 122 may further comprise one or more storage units 1306 and further functionality 1307 useful for the visiting network control node 122 to serve its purpose as visiting network control node. The instructions executable by said processor may be arranged as a computer program 1305 stored in said memory 1304. The processor 1303 and the memory 1304 may be arranged in an arrangement 1301. The arrangement 1301 may alternatively be a micro processor and adequate software and storage therefore, a Programmable Logic Device, PLD, or other electronic component(s)/processing circuit(s) configured to perform the actions, or methods, mentioned above.

According to an embodiment, the identifying comprises identifying that the local subscriber ID is from a range of IDs predefined for devices subscribing to other communication networks than the visiting communication network, the other communication networks being connected to the first network control node and the other communication networks including the home communication network.

Figure 14:
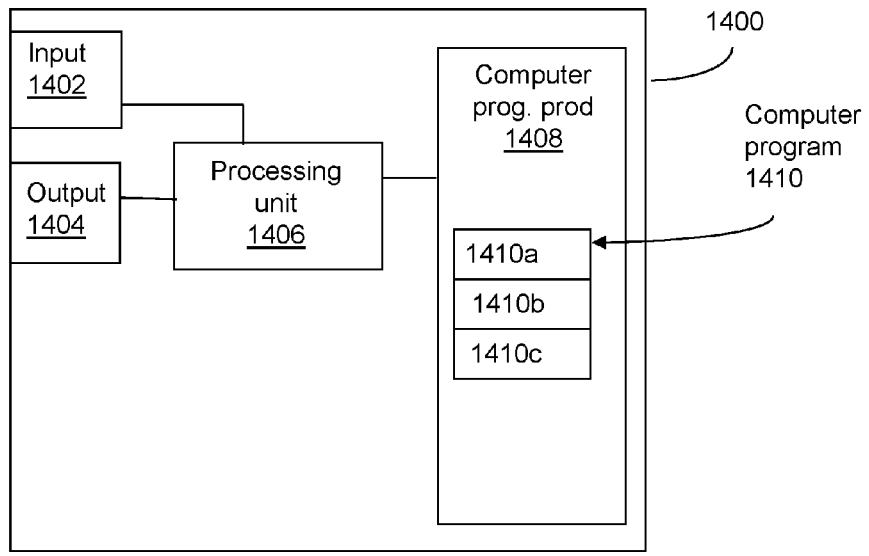

FIG. 14 schematically shows an embodiment of an arrangement 1400 for use in the visiting network control node 122, which arrangement also can be an alternative way of implementing an embodiment of the arrangement 1301 illustrated in FIG. 13. Comprised in the arrangement 1400 is a processing unit 1406, e.g. with a DSP, Digital Signal Processor, or a microprocessor. The processing unit 1406 may be a single unit or a plurality of units to perform different actions of procedures described herein. The arrangement 1400 may also comprise an input unit 1402 for receiving signals from other entities, and an output unit 1404 for providing signal(s) to other entities. The input unit 1402 and the output unit 1404 may be arranged as an integrated entity.

Furthermore, the arrangement 1400 comprises at least one computer program product 1408 in the form of a non-volatile or volatile memory, e.g. an EEPROM (Electrically Erasable Programmable Read-only Memory), a flash memory, a disk drive or a RAM (Random-access memory). The computer program product 1408 comprises a computer program 1410, which comprises code means, which when executed in the processing unit 1406 in the arrangement 1400 causes the arrangement to perform the actions of any of the procedures described earlier in conjunction with FIG. 5.

The computer program 1410 may be configured as a computer program code structured in computer program modules. Hence, in an exemplifying embodiment, the code means in the computer program 1410 of the arrangement 1400 comprises a receiving module 1410a for receiving the signaling request from the communication device, the signaling request comprising the local subscriber ID, an identifying module 1410b for identifying that the received local subscriber ID is associated with a first network control node 130 to which the home network is connected, and a sending module 1410c for sending the signaling request comprising the local subscriber ID to the first network control node.

Figure 15:
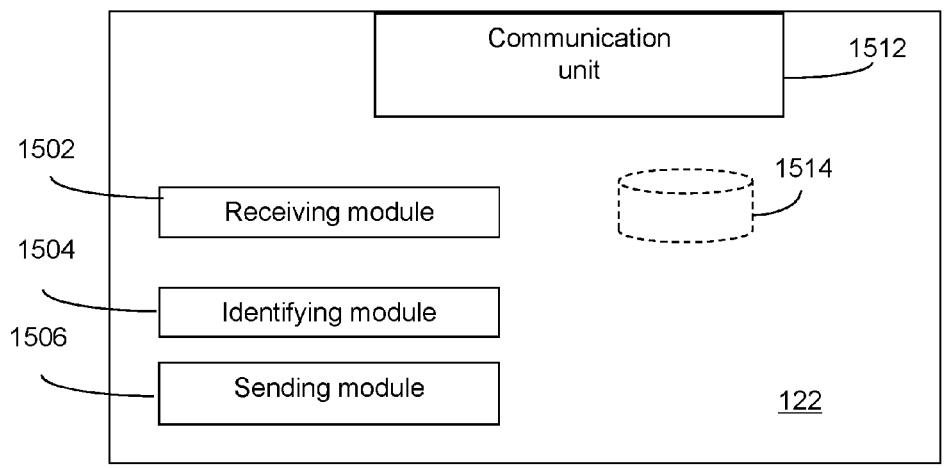

FIG. 15 shows an embodiment of a visiting network control node 122 for routing a signaling request in a communication system comprising a home communication network 110 and a visiting communication network 120, the signaling request originating from a communication device 100 subscribing to the home communication network 110 and having a home subscriber identification, ID. The communication device is further registered to the visiting communication network 120 with a local subscriber ID different from the home subscriber ID and the local subscriber ID is associated with the home subscriber ID. The visiting network control node 122 comprises: a receiving module 1502 for receiving the signaling request from the communication device, the signaling request comprising the local subscriber ID; an identifying module 1504 for identifying that the received local subscriber ID is associated with a first network control node 130 to which the home network is connected, and a sending module 1506 for sending the signaling request comprising the local subscriber ID to the first network control node. The first network control node according to this embodiment may also comprise a conventional communication unit 1512 similar to the communication unit 1302 of FIG. 13 and a memory 1514.

Figure 16:
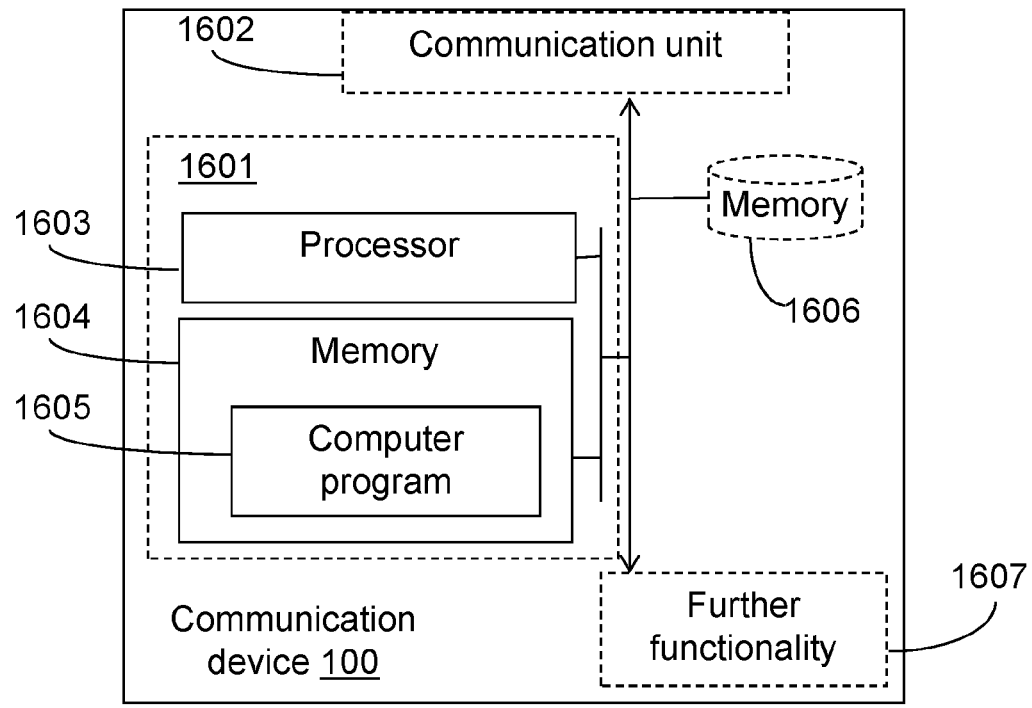

FIG. 16 describes an embodiment of a communication device 100 for communicating in a communication system comprising a home communication network 110 and a visiting communication network 120, the communication device 100 subscribing to the home communication network 110 and having a home subscriber identification, ID, and arranged to contact the visiting communication network 120 using its home subscriber ID. The communication device 100 comprises a processor 1603 and a memory 1604, said memory containing instructions executable by said processor. Said communication device 100 is operative for: receiving a local subscriber ID from the visiting network, for communication in the visiting network, the local subscriber ID being associated with the home subscribed ID; changing from the home subscriber ID to the local subscriber ID, registering to the visiting network using the local subscriber ID, and sending a signaling request to the visiting network comprising the local subscriber ID. The communication device 100 may further comprise a communication unit 1602, which may be considered to comprise conventional means for communicating from and/or to other nodes in the network, such as a base station of a radio access network connected to the visiting network control node. The conventional communication means may include at least one transmitter and at least one receiver. The communication device 100 may further comprise one or more storage units 1606 and further functionality 1607 useful for the communication device to serve its purpose as a communication device, such as a battery. The instructions executable by said processor may be arranged as a computer program 1605 stored in said memory 1604. The processor 1603 and the memory 1604 may be arranged in an arrangement 1601. The arrangement 1601 may alternatively be a micro processor and adequate software and storage therefore, a Programmable Logic Device, PLD, or other electronic component(s)/processing circuit(s) configured to perform the actions, or methods, mentioned above.

Figure 17:
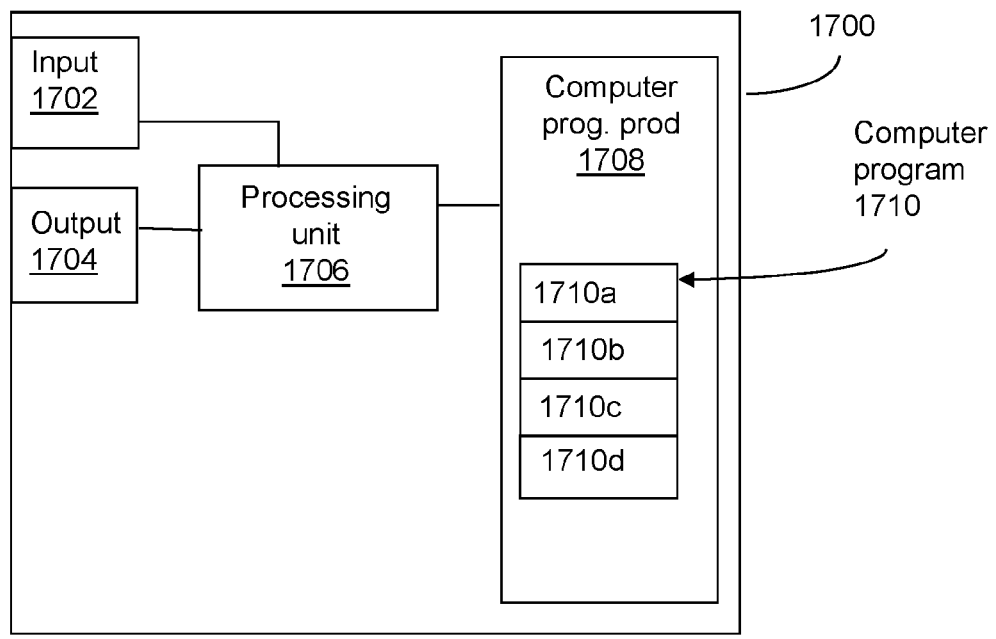

FIG. 17 schematically shows an embodiment of an arrangement 1700 for use in the communication device 100, which arrangement also can be an alternative way of implementing an embodiment of the arrangement 1601 illustrated in FIG. 16. Comprised in the arrangement 1700 is a processing unit 1706, e.g. with a DSP, Digital Signal Processor, or a microprocessor. The processing unit 1706 may be a single unit or a plurality of units to perform different actions of procedures described herein. The arrangement 1700 may also comprise an input unit 1702 for receiving signals from other entities, and an output unit 1704 for providing signal(s) to other entities. The input unit 1702 and the output unit 1704 may be arranged as an integrated entity.

Furthermore, the arrangement 1700 comprises at least one computer program product 1708 in the form of a non-volatile or volatile memory, e.g. an EEPROM (Electrically Erasable Programmable Read-only Memory), a flash memory, a disk drive or a RAM (Random-access memory). The computer program product 1708 comprises a computer program 1710, which comprises code means, which when executed in the processing unit 1706 in the arrangement 1700 causes the arrangement to perform the actions of any of the procedures described earlier in conjunction with FIG. 6.

The computer program 1710 may be configured as a computer program code structured in computer program modules. Hence, in an exemplifying embodiment, the code means in the computer program 1710 of the arrangement 1700 comprises a receiving module 1710a for receiving a local subscriber ID from the visiting network, for communication in the visiting network, the local subscriber ID being associated with the home subscribed ID, a changing module 1710b for (triggering) changing from the home subscriber ID to the local subscriber ID. Further, the code means comprises a registering module 1710c for registering to the visiting network using the local subscriber ID, and a sending module 1710d for sending a signaling request to the visiting network comprising the local subscriber ID.

Figure 18:
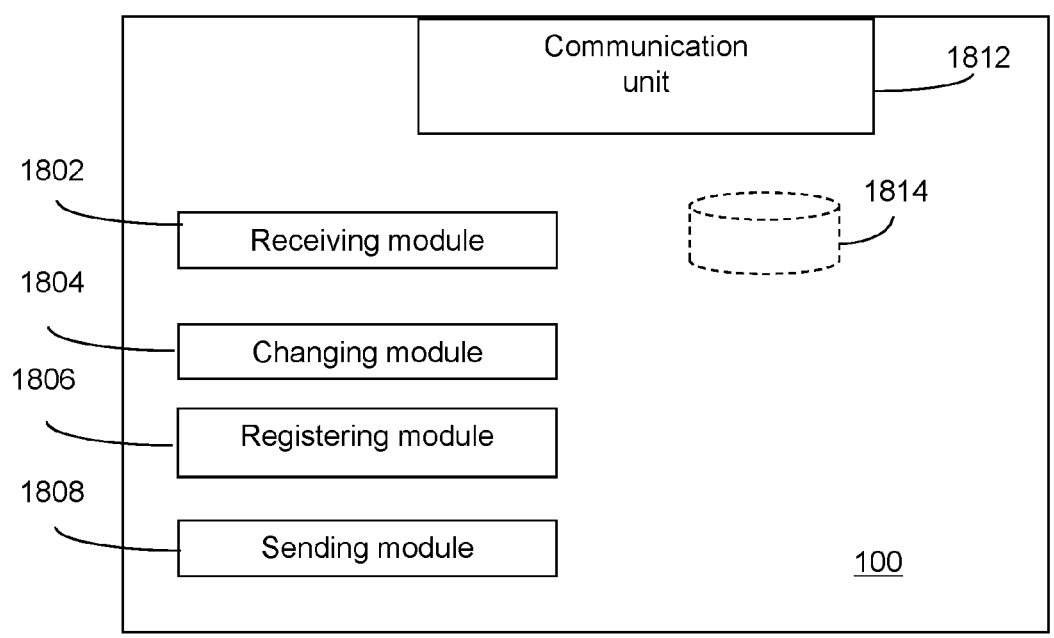

FIG. 18 describes an embodiment of a communication device 100 for communicating in a communication system comprising a home communication network 110 and a visiting communication network 120, the communication device 100 subscribing to the home communication network 110 and having a home subscriber identification, ID, and contacting the visiting communication network 120 using its home subscriber ID. The communication device 100 comprises a receiving module 1802 for receiving a local subscriber ID from the visiting network, for communication in the visiting network, the local subscriber ID being associated with the home subscribed ID and a changing module 1804 for changing from the home subscriber ID to the local subscriber ID. The communication device 100 further comprises a registering module 1806 for registering to the visiting network using the local subscriber ID, and a sending module 1808 for sending a signaling request to the visiting network comprising the local subscriber ID. The communication device 100 according to this embodiment may also comprise a conventional communication unit 1812 similar to the communication unit 1602 of FIG. 16 and a memory 1814.

Individual of the processing units 1106, 1406 and 1706 of FIGS. 11, 14 and 17, respectively, may be a single Central processing unit, CPU, but may also comprise two or more processing units. For example, the processing unit may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM), and the computer program modules described above could in alternative embodiments be distributed on different computer program products in the form of memories within the node.

Although the code means in the embodiments disclosed above in conjunction with FIGS. 10-18 are implemented as computer program modules which when executed in the processing unit causes the apparatus to perform the actions described above in the conjunction with figures mentioned above, at least one of the code means may in alternative embodiments be implemented at least partly as hardware circuits.

By the solution described above, a global enterprise with a high number of communication devices spread all over the world only needs to maintain a single business relationship and billing interface with a single operator (the operator of MNO1) for connecting its globally deployed services, e.g. Machine-to-machine, M2M, services and devices and reusing the same service functionalities for its global business. This is achieved without requirement for roaming agreement between MNO1 and MNO2.

At least some of the present embodiments described in this disclosure has one or more of the following advantages: Enabling for a communication device subscribing to a home communication network to connect to a visiting communication network even without a roaming agreement between the home communication network operator and the visiting communication network operator; Enabling for a communication device subscribing to a home communication network to connect to a visiting communication network without roaming signaling being established between the visiting communication network and the home communication network; Making it possible for the enterprise to keep a single business relationship and billing interface towards the home communication network operator; Making it possible for the enterprise to reuse the same functionality for its services and connectivity all over the world with its single home operator and service provider.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a first network control node for routing a signaling request in a communication system comprising a home communication network and a visiting communication network, the signaling request originating from a communication device subscribing to the home communication network and having a home subscriber identification (ID), the communication device being registered to the visiting communication network with a local subscriber ID different from the home subscriber ID, the local subscriber ID being associated with the home subscriber ID, the method comprising:

receiving the signaling request originating from the communication device, the signaling request comprising the local subscriber ID;

detecting that the local subscriber ID is associated with the home subscriber ID;

in the signaling request, replacing the local subscriber ID with the home subscriber ID; and sending the signaling request comprising the home subscriber ID to a subscriber database of the home network;

wherein the method performed by the first network control node further comprises, before the communication device is registered to the visiting communication network:

receiving a connection attempt from the communication device, the connection attempt comprising the home subscriber ID;

in response to the reception of the connection attempt, linking the home subscriber ID to the local subscriber ID; and providing the local subscriber ID to the communication device.

2. The method according to claim 1, further comprising, before the communication device is registered to the visiting communication network, and after receiving the connection attempt from the device:

checking that the communication device is allowed to acquire the local subscriber ID, and, based on the check that the communication device is allowed to acquire the local subscriber ID further comprising, linking the home subscriber ID to the local subscriber ID; and providing the local subscriber ID to the communication device.

3. The method according to claim 2, further comprising storing the link of the home subscriber ID to the local subscriber ID in a mapping table, wherein the detecting that the local subscriber ID is associated with the home subscriber ID comprises checking the mapping table and finding the link.

4. The method according to claim 1, wherein the local subscriber ID is from a range of IDs that is predefined for devices subscribing to the home network, including the communication device.

5. The method according to claim 1, wherein the first network control node is positioned in a first network different from the home network and different from the visiting network, and wherein the subscriber database of the home network is positioned in the first network.

6. A method performed by a visiting network control node for routing a signaling request in a communication system comprising a home communication network and a visiting communication network, the signaling request originating from a communication device subscribing to the home communication network and having a home subscriber identification (ID), the communication device further being registered to the visiting communication network with a local subscriber ID different from the home subscriber ID, the local subscriber ID being associated with the home subscriber ID, the method comprising:

receiving the signaling request from the communication device, the signaling request comprising the local subscriber ID;

identifying that the received local subscriber ID is associated with a first network control node to which the home network is connected, and sending the signaling request comprising the local subscriber ID to the first network control node, wherein the method further comprising, before the communication device is registered to the visiting communication network:
providing the local subscriber ID to the communication device, wherein the visiting network control node previously received the local subscriber ID to the communication device from the first network control node.

7. The method according to claim 6, wherein the identifying comprises identifying that the local subscriber ID is from a range of IDs predefined for devices subscribing to other communication networks than the visiting communication network, the other communication networks being connected to the first network control node and the other communication networks including the home communication network.

8. A method performed by a communication device for communicating in a communication system comprising a home communication network, a first network control node, and a visiting communication network, the communication device subscribing to the home communication network and having a home subscriber identification (ID), and contacting the visiting communication network using its home subscriber ID, the method comprising:
receiving a local subscriber ID from the visiting communication network, for communication in the visiting communication network, the local subscriber ID being associated with the home subscriber ID, wherein the visiting communication network previously received the local subscriber ID from the first network control node,
changing from the home subscriber ID to the local subscriber ID,
registering to the visiting communication network using the local subscriber ID, and
sending a signaling request to the visiting communication network comprising the local subscriber ID.

9. A first network control node for routing a signaling request in a communication system comprising a home communication network and a visiting communication network, the signaling request originating from a communication device subscribing to the home communication network and having a home subscriber identification (ID), the communication device being registered to the visiting communication network with a local subscriber ID different from the home subscriber ID, the local subscriber ID being associated with the home subscriber ID, the first network control node comprising a processor and a memory, said memory containing instructions executable by said processor whereby said first network control node is operative to:
receive the signaling request originating from the communication device, the signaling request comprising the local subscriber ID;
detect that the local subscriber ID is associated with the home subscriber ID;
replace, in the signaling request, the local subscriber ID with the home subscriber ID; and
send the signaling request comprising the home subscriber ID to a subscriber database of the home network;
wherein the first network control node is before the communication device is registered to the visiting communication network further operative to:
receive a connection attempt from the communication device, the connection attempt comprising the home subscriber ID;
in response to the reception of the connection attempt, link the home subscriber ID to the local subscriber ID; and
provide the local subscriber ID to the communication device.

10. The first network control node according to claim 9, wherein the first network control node further being operative before the communication device is registered to the visiting communication network, and after receiving the connection attempt from the device to:
check that the communication device is allowed to acquire the local subscriber ID, and,
based on the check that the communication device is allowed to acquire the local subscriber ID the first network control node is further operative to:
link the home subscriber ID to the local subscriber ID; and
provide the local subscriber ID to the communication device.

11. The first network control node according to claim 10, further being operative to store the link of the home subscriber ID to the local subscriber ID in a mapping table, and wherein the detect operation that the local subscriber ID is associated with the home subscriber ID comprises checking the mapping table and finding the link.

12. The first network control node according to claim 9, wherein the local subscriber ID is from a range of IDs that is predefined for devices subscribing to the home network, including the communication device.

13. The first network control node according to claim 9, wherein the first network control node is positioned in a first network different from the home network and different from the visiting network, and wherein the subscriber database of the home network is positioned in the first network.

* * * * *